United States Patent [19]

Spatafora et al.

[11] Patent Number: 5,291,985
[45] Date of Patent: Mar. 8, 1994

[54] METHOD AND DEVICE FOR FORMING GROUPS OF FLAT PRODUCTS, IN PARTICULAR BISCUITS, FOR SUPPLY TO A PACKING LINE

[75] Inventors: Mario Spatafora; Giulio Strazzari, both of Bologna, Italy

[73] Assignee: Azionaria Construzioni Macchine Automatiche A.C.M.A. S.p.A., Bologna, Italy

[21] Appl. No.: 964,887

[22] Filed: Oct. 22, 1992

[30] Foreign Application Priority Data

Oct. 23, 1991 [IT] Italy .............................. B091A000391

[51] Int. Cl.⁵ .......................................... B65G 47/26
[52] U.S. Cl. ................................... 198/419.3; 198/461; 198/471.1
[58] Field of Search ................... 198/419.3, 461, 471.1

[56] References Cited

U.S. PATENT DOCUMENTS

| | | | |
|---|---|---|---|
| 2,744,608 | 5/1956 | Ardell et al. | 198/419.3 X |
| 3,325,966 | 6/1967 | Bruce et al. | 198/419.3 X |
| 3,850,096 | 11/1974 | Taniguchi | 198/419.3 X |
| 4,564,104 | 1/1986 | Anderson | 198/419.3 X |
| 5,035,315 | 7/1991 | Fukusaki et al. | 198/419.3 X |

FOREIGN PATENT DOCUMENTS

| | | |
|---|---|---|
| 0120650 | 10/1984 | European Pat. Off. |
| 8702340 | 4/1987 | Japan ................ 198/419.3 |
| 2101973 | 1/1983 | United Kingdom |

Primary Examiner—D. Glenn Dayoan
Attorney, Agent, or Firm—Oblon, Spivak, McClelland, Maier & Neustadt

[57] ABSTRACT

A method and device for forming groups of flat products, in particular biscuits, for supply to a wrapping line, whereby the products, on a supporting surface, are withdrawn by a conveyor unit and transferred onto a pocket conveyor in a sequence having a series of gaps between adjacent products. Each pocket on the conveyor being designed to receive a respective group of products, and being defined by two projections, each of which travels in time with a respective gap through a loading station where the products are loaded onto the pocket conveyor.

9 Claims, 1 Drawing Sheet

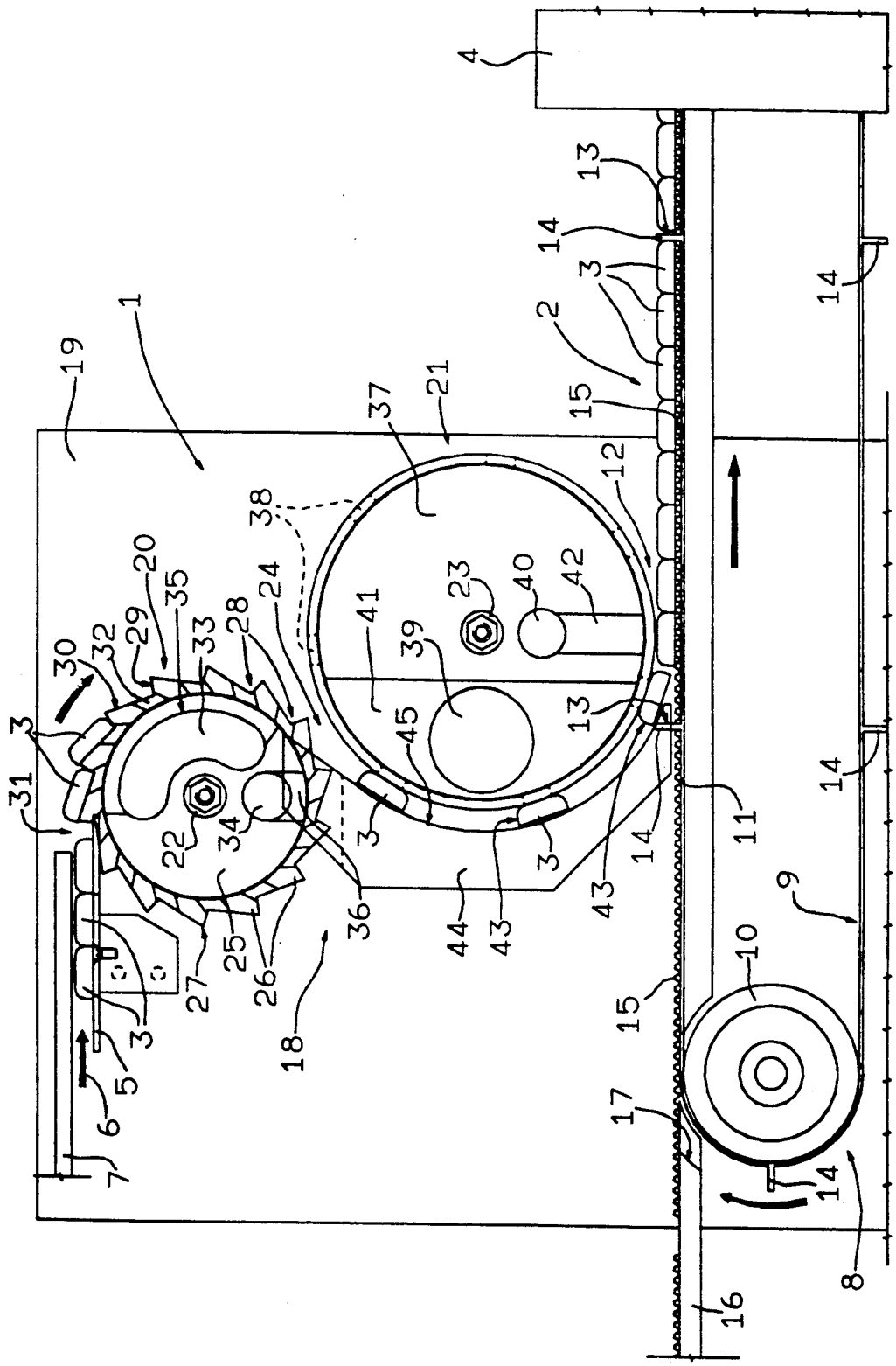

METHOD AND DEVICE FOR FORMING GROUPS OF FLAT PRODUCTS, IN PARTICULAR BISCUITS, FOR SUPPLY TO A PACKING LINE

BACKGROUND OF THE INVENTION

The present invention relates to a method of forming groups of flat products, in particular biscuits, for supply to a packing line.

The present invention is especially suitable for use in the food industry, particularly for packing flat food products such as biscuits or similar, to which the following description refers purely by way of example.

Biscuit packing lines are normally connected directly to the output of the oven in which the biscuits are baked, and comprise a vibratory conveyor on which the biscuits, usually rectangular in shape, travel with the longer longitudinal edges parallel to the traveling direction of the conveyor. As they travel along the conveyor, the biscuits, which are originally laid flat, are vibrated firstly into a partially overlapping position, and then into a gradually raised position "on edge" in which they are fed axially along the vibratory conveyor into and to the bottom end of a downward-curving conduit extending over an arc of substantially 90°. At the bottom end of the conduit, the biscuits are therefore arranged one on top of the other in a column, again laid flat and substantially parallel to the vibratory conveyor, and are fed, normally one at a time by a transverse pusher, into the pocket of a conveyor, so as to form, inside the pocket, a group which is then fed by the conveyor to a wrapping line consisting of a packing machine.

The above known method of forming groups of biscuits for supply to a packing machine presents several drawbacks, foremost of which is the tendency of the biscuits, as they are raised from the flat to the on-edge position, to topple over at random, thus interrupting supply to the packing machine. Moreover, due to inconsistency in the size of the biscuits, the width of the curved conduit, which acts as a feedbox in which the biscuits are collected, must be larger than the average size of the biscuits, thus resulting in inconsistent positioning of the biscuits in relation to the transverse pusher, and, consequently, in packing problems due to inconsistency in the position of the biscuits and in the shape of the groups formed inside the pockets on the conveyor supplying the packing machine.

SUMMARY OF THE INVENTION

It is an object of the present invention to provide a method of forming groups of flat products for supply to a packing machine, designed to overcome the aforementioned drawbacks.

According to the present invention, there is provided a method of forming groups of flat products, in particular biscuits, for supply to a wrapping line, said method comprising stages consisting in feeding the products, contacting one another, in a given direction along a supporting surface; and in transferring the products, by means of a conveyor unit, from said supporting surface on to an output conveyor for forming the products into groups and supplying said wrapping line; characterized by the fact that the products are transferred from the supporting surface to the output conveyor in such a manner as to be fed on to the output conveyor in a sequence presenting a series of gaps between adjacent products; the output conveyor presenting a series of pockets, each designed to receive a number of products forming one said group, and each defined by two projections, each traveling in time with a respective said gap through a loading station wherein the products are loaded on to the output conveyor.

The present invention also relates to a device for forming groups of flat products, in particular biscuits, for supply to a wrapping line.

According to the present invention, there is provided a device for forming groups of flat products, in particular biscuits, for supply to a wrapping line, said device comprising a supporting surface along which the products are fed, contacting one another, in a given direction; an output conveyor for forming the products into groups and supplying said wrapping line; a station for loading the products on to the output conveyor; and a conveyor unit for transferring the products from said supporting surface to said loading station; characterized by the fact that said conveyor unit comprises gap forming means for feeding the products to said loading station in a sequence presenting a series of gaps between adjacent products; the output conveyor presenting a series of pockets, each designed to receive a number of products forming one said group, and each defined by two projections; and first drive means being provided for feeding each said projection through said loading station in time with a respective said gap.

According to a preferred embodiment of the above device, said gap forming means comprise spacing means for equally spacing said products and so forming a gap between each pair of adjacent products.

The gap forming means preferably also comprise timing means for withdrawing the products in an orderly sequence off the supporting surface and feeding said orderly sequence of products to said spacing means.

BRIEF DESCRIPTION OF THE DRAWING

A non-limiting embodiment of the present invention will be described with reference to the accompanying schematic drawing.

DETAILED DESCRIPTION OF THE INVENTION

Number 1 in the accompanying drawing indicates a device for forming groups 2 of flat products, in particular biscuits 3, for supply to a wrapping line defined by a known packing machine 4.

Device 1 comprises a supporting surface 5, normally a vibratory conveyor, along which biscuits 3 are fed, contacting one another, in the direction of arrow 6 and beneath a plate 7 for preventing biscuits 3 from overlapping even partially as they travel along surface 5.

Device 1 also comprises an output conveyor 8 for forming and successively feeding groups 2 to machine 4. Conveyor 8 is a loop conveyor having a belt 9 looped about two pulleys 10, only one of which is shown, and one of which is powered for driving belt 9 at a given substantially constant speed. Belt 9 comprises a substantially horizontal top branch 11 extending through a loading station 12 where biscuits 3 are loaded successively into pockets 13 on conveyor 8, each designed to receive a respective group 2 and each defined by respective end projections 14 integral with belt 9.

Biscuits 3 in each group 2 are supported on branch 11 of belt 9 and inside respective pocket 13 via the interposition of a sheet 15 of relatively rigid material, such as cardboard, extending between projections 14 of pocket 13 and forming part of a succession of similar sheets 15 fed on to conveyor 8 along a conveyor 16 flush and aligned with branch 11 of conveyor 8. The output end of conveyor 16 is substantially tangent to conveyor 8 at one of pulleys 10, and presents a front opening 17 enabling the passage of projections 14 projecting radially outwards of pulley 10.

Device 1 also comprises a conveyor unit 18 for transferring biscuits 3 from supporting surface 5 to loading station 12.

Together with supporting surface 5 and conveyor 8, unit 18 is supported on a plate 19 parallel to the plane of the accompanying drawing, and comprises a first and second roller conveyor 20 and 21 rotated in opposite directions by respective shafts 22 and 23 and about respective axes perpendicular to plate 19. Roller conveyors 20 and 21 are substantially tangent to each other at a transfer station 24, and are arranged in series between supporting surface 5 and loading station 12, wherein roller 21, rotating anticlockwise in the drawing, is substantially tangent to top branch 11 of belt 9.

Roller 20 is a timing roller mounted for rotation (clockwise in the drawing) on a fixed cylindrical support 25, and having a number of outer peripheral ribs 26 defining, about roller 20, a substantially serrated edge 27 facing rearwards in relation to the rotation direction of roller 20. More specifically, each pair of adjacent ribs 26 defines a seat 28 comprising a front surface 29 (in relation to the rotation direction of roller 20) located substantially radially in relation to roller 20, and a rear surface 30 substantially tangent to the edge of roller 20. Each surface 30, measured perpendicular to respective surface 29, is more or less the same length as biscuit 3 measured in the traveling direction of biscuits 3 along surface 5, and is aligned with supporting surface 5 at station 31 wherein biscuits 3 are unloaded off surface 5.

Each seat 28 presents a suction conduit 32 catering to both surfaces 29 and 30 and communicating selectively with an axial suction channel 33 in cylindrical support 25 via a first peripheral groove 35 formed on support 25 between unloading station 31 and transfer station 24, and with an axial compressed air supply channel 34 in support 25, via a second peripheral groove 36 formed on support 25 at transfer station 24.

Roller 21 is an accelerating output roller mounted for rotation (anticlockwise in the drawing) on a fixed cylindrical support 37, and having a number of equally-spaced outer peripheral through holes 38, each communicating selectively with an axial suction channel 39 in support 37 via a first peripheral groove 41 formed on support 37 between transfer station 24 and loading station 12, and with an axial compressed air supply channel 40 in support 37 via a second peripheral groove 42 formed on support 37 at loading station 12. The distance between adjacent holes 38 is greater than that between adjacent conduits 32 and said length of biscuits 3, so that a gap 43 is formed between adjacent biscuits 3 centered on respective holes 38 on roller 21.

Finally, plate 19 supports a curved guide plate 44 facing and defining with the edge of roller 21 a channel 45 for feeding biscuits 3 from transfer station 24 to loading station 12.

In actual use, biscuits 3, maintained in the flat position by plate 7, are fed in substantially random manner along supporting surface 5 to unloading station 31, and are withdrawn and fed by roller 20 in equally-spaced manner to transfer station 24.

More specifically, as roller 20 is rotated by drive shaft 22, surfaces 30 of seats 28 travel successively at a first substantially constant surface speed V1 through unloading station 31 where each surface 30 is positioned substantially flush with surface 5 for a receiving AC respective biscuit 3, which is held by respective suction conduit 32 not only on to surface 30 but also on to respective front surface 29.

Biscuits 3 are thus withdrawn at constant speed, and with no damage, off surface 5, and are fed in equally-spaced manner by roller 20 to transfer station 24, where the suction through respective conduits 32 is cut off and biscuits 3 transferred successively on to roller 21.

Roller 21 is rotated by drive shaft 23 at a greater surface speed than roller 20. More specifically, roller 21 presents a surface speed V2 greater than V1, and substantially such that the ratio of V2 to V1 equals the ratio of D2 to D1, where D1 and D2 are the center distances of adjacent conduits 32 and holes 38 respectively.

The rotation of rollers 20 and 21 is so timed that a seat 28 enters transfer station 24 simultaneously with a hole 38.

Biscuits 3 are thus spaced so as to form gaps 43, and are fed along channel 45 into a respective pocket 13, so as to form a respective group 2 in which biscuits 3 are arranged substantially contacting one another. For this purpose, belt 9 of conveyor 8 is driven at the same speed as V1, and each projection 14 is fed forward in time with a respective gap 43.

The last biscuit 3 in each group 2 may be loaded into respective pocket 13 substantially contacting rear projection 14, by virtue of gaps 43 permitting rear projection 14 to penetrate freely inside channel 45 with no interference from the incoming biscuit 3.

We claim:

1. A method of forming groups of flat products, particularly biscuits, for supply to a wrapping line, said method comprising the steps of:
   feeding the products, contacting one another, in a given direction along a supporting surface; and
   transferring the products, by means of a conveyor unit, from said supporting surface onto an output conveyor for forming the products into groups to supply said wrapping line;
   wherein said transferring step comprises the step of:
   feeding the products onto the output conveyor in a sequence presenting a series of gaps between adjacent products, by means of said conveyor unit which comprises a first conveyor and a second conveyor arranged in series between said supporting surface and said output conveyor; wherein:
   the first conveyor is driven at a first speed for successfully withdrawing the products from the supporting surface;
   the second conveyor is driven at a second speed greater than the first speed for spacing the products and forming said gaps; and
   the output conveyor defines a series of pockets each of which is designed to receive a number of said products to form one of said groups, each of said pockets being defined by two projections, each traveling in time with a respective one of said gaps through a loading station wherein the products are loaded onto the output conveyor.

2. A method as claimed in claim 1, wherein said series of gaps is a uniform series, and the adjacent products in said sequence are separated by a respective one of said gaps.

3. A method as claimed in claim 1, wherein said output conveyor is driven at substantially the same speed as said first speed.

4. A device for forming groups of flat products, in particular biscuits, for supply to a wrapping line, said device comprising:
- a supporting surface along which the products are fed, contacting one another, in a given direction;
- an output conveyor for forming the products into groups and supplying said wrapping line;
- a loading station for loading the products onto the output conveyor; and
- a conveyor unit for transferring the products from said support surface to said loading station; wherein:
- said conveyor unit comprises gap forming means for feeding the products to said loading station in a sequence presenting a series of gaps between adjacent products, said gap forming means comprising timing means for withdrawing said products in an orderly sequence from said supporting surface, and spacing means for receiving said orderly sequence and for evenly spacing the products thereof so as to form said gap between each pair of adjacent products;
- the output conveyor comprises a series of pockets, each designed to receive a number of products forming one of said groups, and each defined by two projections; and
- first drive means are provided for feeding each of said projections through said loading station in time with a respective one of said gaps.

5. A device for forming groups of flat products, in particular biscuits, for supply to a wrapping line, said device comprising:
- a supporting surface along which the products are fed, contacting one another, in a given direction;
- an output conveyor for forming the products into groups and supplying said wrapping line;
- a loading station for loading the products onto the output conveyor; and
- a conveyor unit for transferring the products from said supporting surface to said loading station; wherein:
- said conveyor unit comprises gap forming means for feeding the products to said loading station in a sequence presenting a series of gaps between adjacent products;
- the output conveyor comprises a series of pockets, each designed to receive a number of products forming one of said groups, and each defined by two projections;
- first drive means are provided for feeding each of said projections through said loading station in time with a respective one of said gaps;
- said gap forming means comprising said conveyor unit comprises a first conveyor and a second conveyor arranged in series between said supporting surface and said loading station;
- second drive means are connected to and drive the first conveyor at a first speed for withdrawing the products from the supporting surface in said orderly sequence; and
- third drive means are connected to and drive the second conveyor at a second speed greater than the first speed for spacing the products and forming said gaps.

6. A device as claimed in claim 5, wherein said first drive means provide for driving said output conveyor at a speed substantially equal to said first speed.

7. A device as claimed in claim 6, wherein said first conveyor comprises a fixed cylindrical support, and a roller mounted for rotation in a given direction on said fixed cylindrical support and having a number of outer peripheral ribs defining, about the roller, a substantially serrated edge facing rearwards in relation to said rotation direction.

8. A device as claimed in claim 7, wherein each pair of adjacent ribs of said outer peripheral ribs defines a seat for conveying a respective one of said products, each seat presenting a front surface, in relation to said rotation direction, located substantially radially in relation to said roller, and a rear surface substantially tangent to the edge of the roller.

9. A device as claimed in claim 8, wherein each said seat presents a suction conduit for the front surface and the rear surface of said seat.

* * * * *

UNITED STATES PATENT AND TRADEMARK OFFICE
CERTIFICATE OF CORRECTION

PATENT NO. : 5,291,985
DATED : March 8, 1994
INVENTOR(S) : Mario SPATAFORA, et al.

It is certified that error appears in the above-indentified patent and that said Letters Patent is hereby corrected as shown below:

On the title page, Item [73], "Construzioni" should
    read --Costruzioni--.

Signed and Sealed this

Eighteenth Day of October, 1994

Attest:

BRUCE LEHMAN

Attesting Officer     Commissioner of Patents and Trademarks